United States Patent [19]

Baumbach et al.

[11] 3,849,750

[45] Nov. 19, 1974

[54] LINE PROTECTOR FOR A COMMUNICATION CIRCUIT

[75] Inventors: Bertram W. Baumbach; Richard E. Nelson, both of Arlington Heights, Ill.

[73] Assignee: Reliable Electric Company, Franklin Park, Ill.

[22] Filed: Jan. 2, 1974

[21] Appl. No.: 429,871

[52] U.S. Cl. .................. 337/32, 337/33, 337/34, 317/9 R
[51] Int. Cl. ......................................... H01h 39/00
[58] Field of Search ............ 337/31, 32, 33, 34, 35, 337/152, 199, 16, 17; 317/62, 69, 51, 66, 16, 9 R; 313/192

[56] References Cited
UNITED STATES PATENTS

| | | | |
|---|---|---|---|
| 2,481,298 | 9/1949 | Eldridge, Jr. | 337/33 |
| 3,281,625 | 10/1966 | Wanaselja | 317/9 R |
| 3,543,207 | 11/1970 | Kawiecki | 337/34 X |

Primary Examiner—R. N. Envall
Attorney, Agent, or Firm—Olson, Trexler, Wolters, Bushnell & Fosse, Ltd.

[57] ABSTRACT

A line protector for a communications circuit provides overvoltage and overcurrent protection. The overvoltage protection is effected through a carbon electrode or gas tube unit that provides an arc gap from the line to ground. For overcurrent protection a fusible element melts and a volute spring presses the overvoltage unit toward the base of the protector and forms a direct metallic circuit from the line to ground, bypassing the electrodes of the unit. A shunt houses the overvoltage protector unit and cooperates with the volute spring to carry the overcurrent to ground. A heat coil may be provided in the line circuit and located between the overvoltage protective unit and the base so as to keep the length of the line current path within the protector to a minimum. The various subassemblies of the protector are positioned in line and substantially coaxial within the protector housing.

15 Claims, 14 Drawing Figures

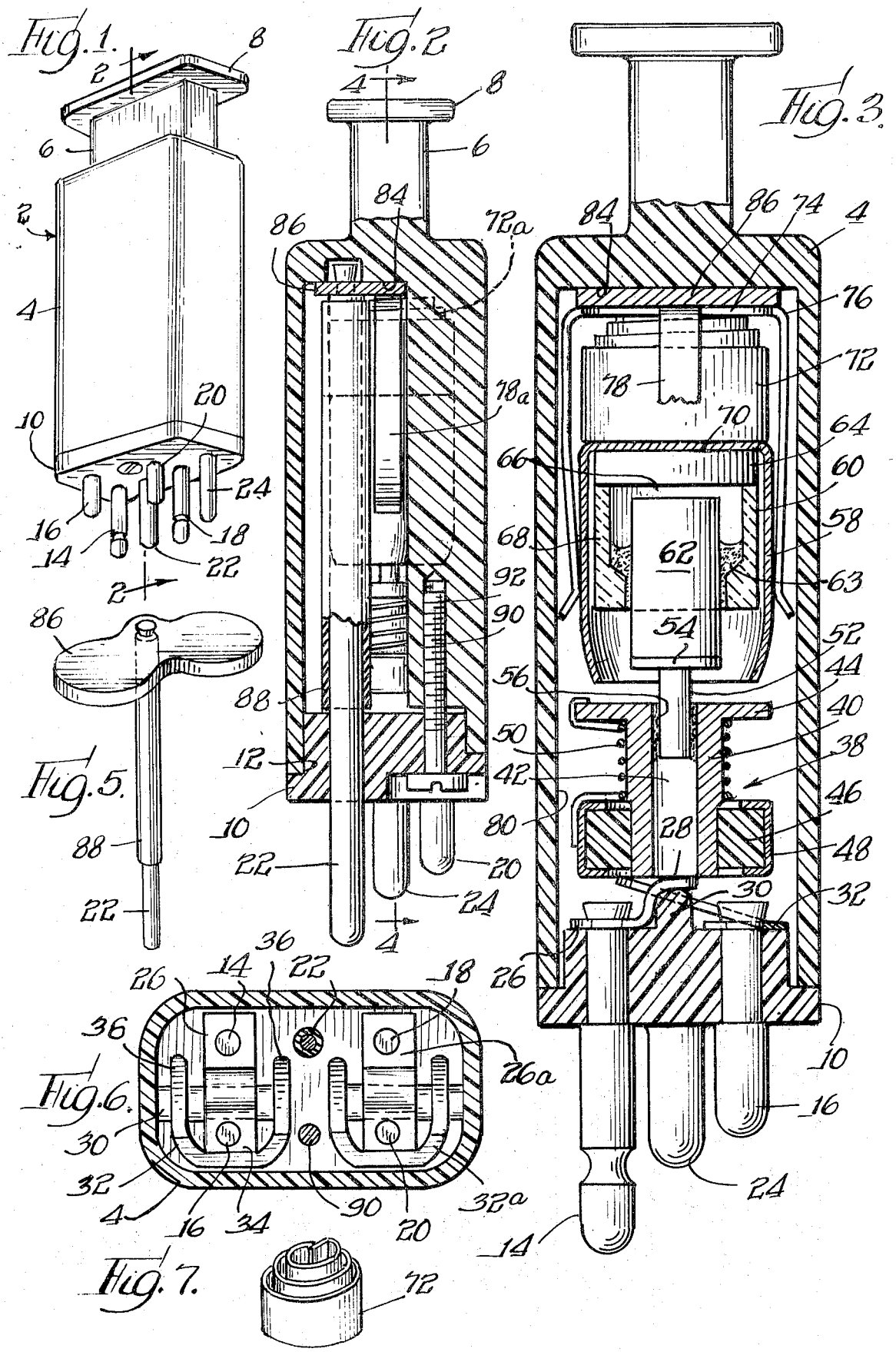

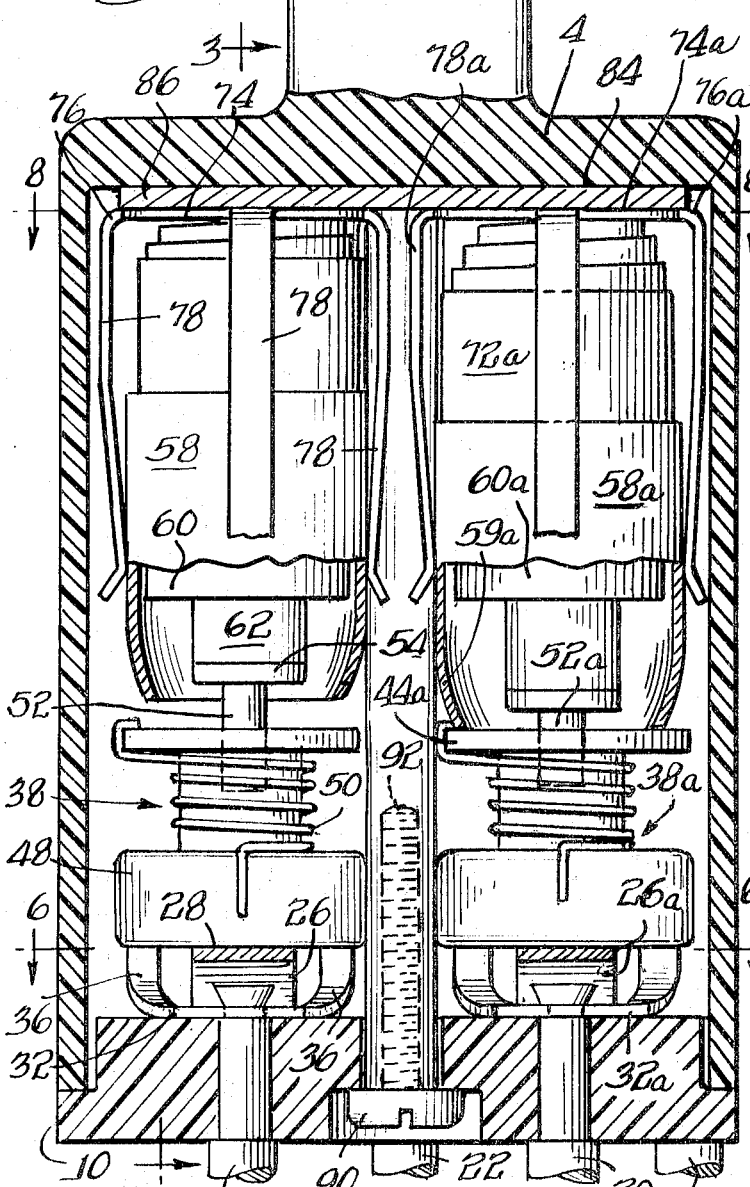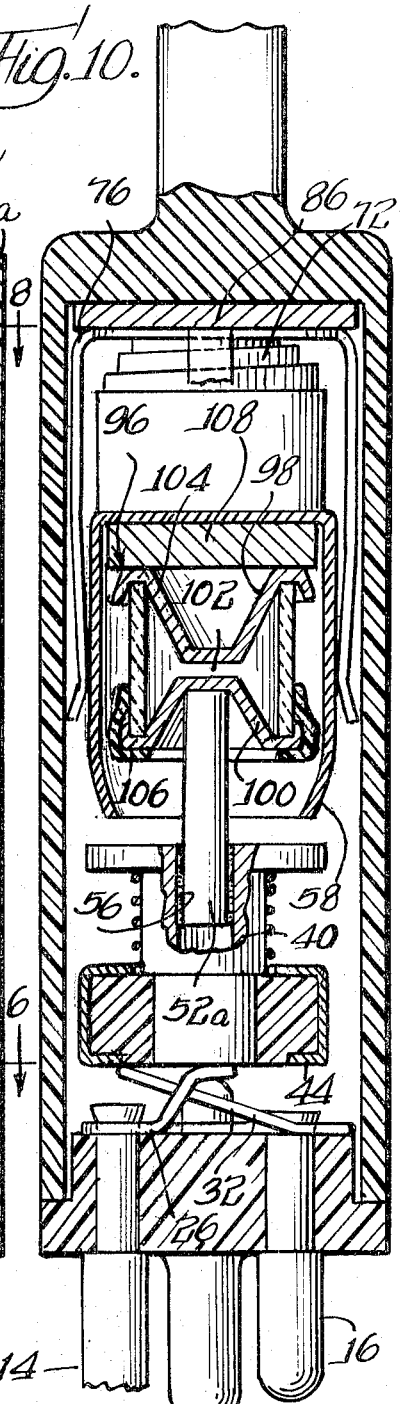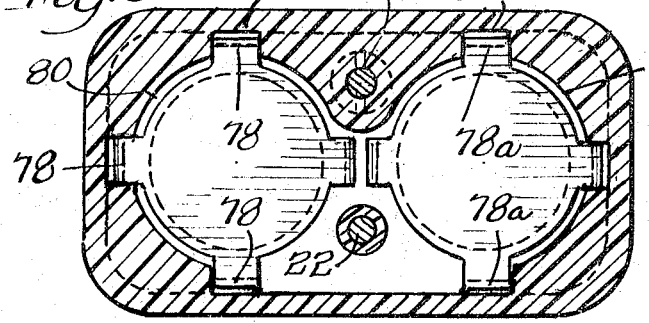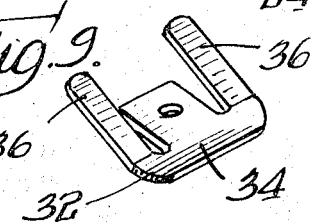

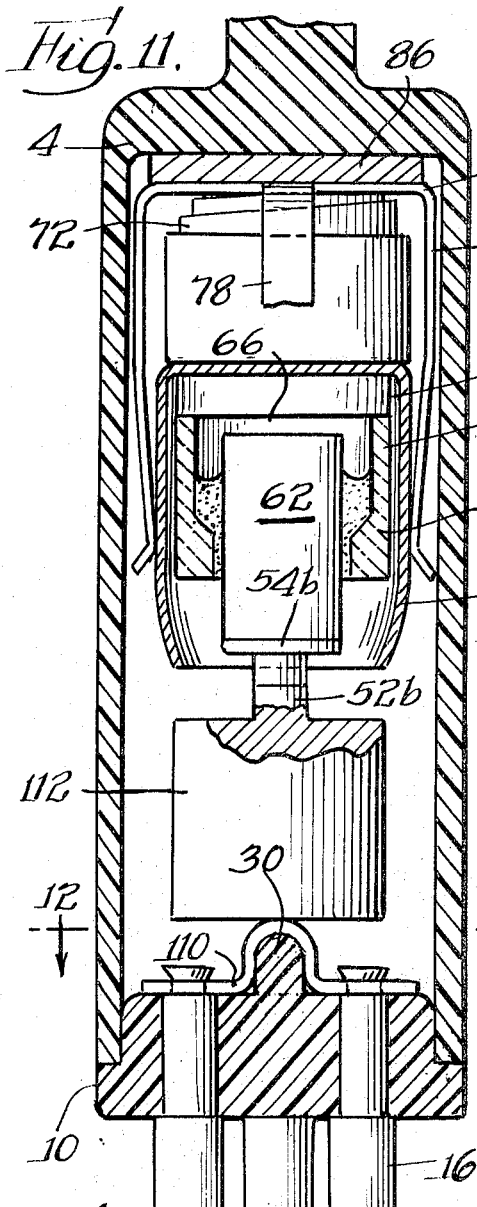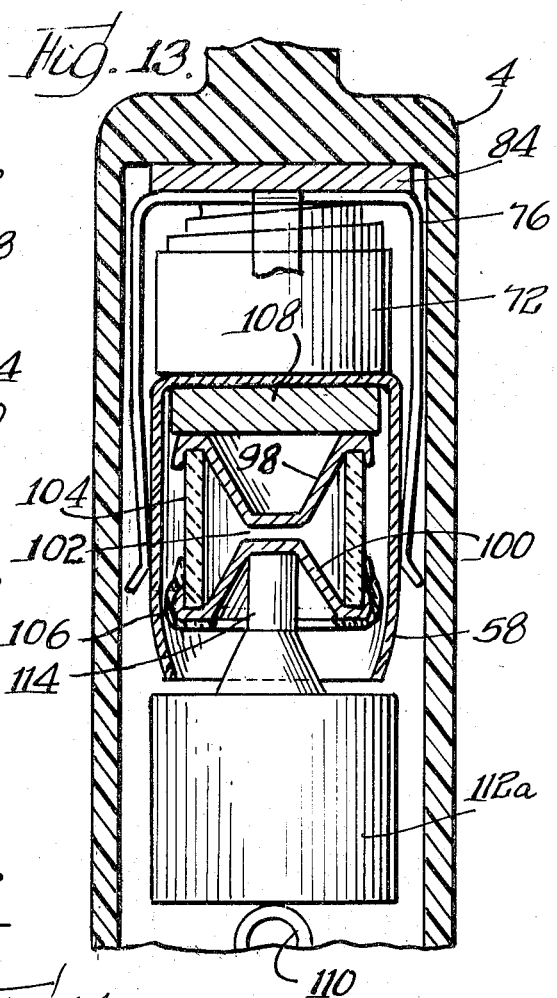

LINE PROTECTOR FOR A COMMUNICATION CIRCUIT

BACKGROUND OF THE INVENTION

The present invention relates to line protectors of the type that are located between central office switching equipment and inside switching related equipment. These protectors serve to protect the inside equipment from damage as a result of overvoltage and overcurrent conditions on the outside lines. Examples of such protectors are shown in U.S. Pat. Nos. 3,743,888 issued July 3, 1973, 3,573,695 issued April 6, 1971 and 3,587,021 issued June 22, 1971.

Protectors of the foregoing type sometimes employ in the line circuit a heat coil which causes a fusible solder element to melt during an overcurrent line condition so that a spring within the protector brings a pair of contacts together to form a direct metallic circuit from the line to ground. Under such conditions a coil spring is frequently relied upon to carry large overload currents of long duration. This has not always been satisfactory since the coil spring may not be able to carry the requisite current. In addition, the heating of the coil spring from the overcurrent may cause it to lose its temper, resulting in separation of or loose engagement of the aforesaid pair of contacts.

Also, where a heat coil is used in the line circuit of a protector it is desirable that the circuit path within the protector be as short as possible and with as few possible surface-to-surface contacts therein. Such an arrangement tends to reduce the noise on the line during normal operating conditions. In the past, protectors with heat coils have sometimes tended to be noisy due to unnecessarily long circuit paths and multiple surface-to-surface contacts of components in the line circuit within the protector.

Another problem with line protectors of the type with which the present invention is concerned lies in the need for simplification of the insertion of the subassemblies into the protector housing so as to reduce the cost of manufacture of the protector. Different user requirements frequently necessitate variations in the internal structure of the protector. For instance, some versions of the protector require carbon electrodes while others require the use of gas-filled tubes. Moreover, heat coils may or may not be required. In any event, it is preferred that protector units be designed with a certain number of standardized or common parts so that numerous variations of the protector can be readily made.

OBJECTS AND SUMMARY OF THE INVENTION

An object of the present invention is to provide a line protector of the general type stated which tends to reduce line noise by keeping the line circuit components within the protector confined to a relatively short path and with a minimum number of engaging contacts.

A further object of this invention is to provide a line protector in which a number of the sub-assemblies may be inserted into the protector housing so as to lie in line and substantially coaxial therein, thereby not only reducing the cost of manufacture of the protector but also facilitating disassembly and reassembly thereof for maintenance purposes.

A still further object of this invention is to provide a line protector of the tupe stated that requires a minimum of modification to produce various versions of the protector, such as those with carbon electrodes or gas tubes, with or without heat coils.

Another important object of this invention is to provide a protector of the type stated which utilizes a shunt and a volute spring which are conductively in parallel to carry large overload currents while at the same time insuring that the grounding of the line circuit in such overcurrent condition is not interrupted.

A still further object of this invention is to provide a line protector that, in an overcurrent condition, forms a shunt external to the electrodes that is more effective than has heretofore been provided. This is particularly important where the protector utilizes gas tubes as distinguished from carbon electrodes. Where gas tubes are used, the line circuit will be grounded in an overcurrent condition that is sufficient to melt the solder element. In situations where high currents are applied for only a short period of time (too short to melt the solder element) erosion of the electrodes of the gas tube will take place. In either event, the line is grounded through a circuit that bypasses the electrodes of the gas tube so that the protector need not rely upon an internal short circuit of the gas tube electrodes for grounding purposes.

In accordance with the foregoing objects the line protector of the present invention comprises a housing of insulating material including a base, line terminals in the base, a ground terminal in the base, overvoltage protective means in spaced relation to the base, the overvoltage protective means having spaced electrodes forming an arc gap, means forming a line circuit between the line terminals, first means forming a grounding circuit between one electrode and the ground terminal, second means forming a conductive connection between the line circuit and the other electrode, and longitudinally extensible spring means biasing the protective means toward the base. The spring means forms part of the ground circuit. Also, the spring means, the protective means and the sound-recited means are structures that are in line within the housing and are substantially coaxial.

The aforesaid grounding circuit between said one electrode and said ground terminal includes a shunt which cooperates with the spring means so that both serve to carry the overload current. The spring means is preferably a volute spring. The shunt constitutes a receptacle for the protective means and the volute spring. Where a heat coil is used, the latter is positioned adjacent to the base of the housing whereby a short line circuit path is provided within the protector housing.

BRIEF DESCRIPTION OF THE FIGURES

FIG. 1 is a perspective view of a line protector constructed in accordance with and embodying the present invention;

FIG. 2 is an enlarged sectional view as seen from line 2—2 of FIG. 1;

FIG. 3 is a further enlarged sectional view taken along the line 3—3 of FIG. 4, the latter being on the second sheet of drawing;

FIG. 4 is a sectional view taken along line 4—4 of FIG. 2;

FIG. 5 is a fragmentary perspective view of the assembled ground pin and ground plate which form part of the present invention;

FIG. 6 is a sectional view taken along line 6—6 of FIG. 4;

FIG. 7 is a perspective view of the volute spring which forms part of the present invention;

FIG. 8 is a sectional view taken along line 8—8 of FIG. 4;

FIG. 9 is a perspective view of the bobbin contact which forms part of the present invention;

FIG. 10 is a sectional view similar to FIG. 3 and showing a modified form of protector in accordance with the present invention;

FIG. 11 is a sectional view similar to FIG. 10 and showing a still further modified form of protector;

FIG. 12 is a sectional view taken along line 12—12 of FIG. 11;

FIG. 13 is a fragmentary sectional view similar to FIG. 11 and showing a still further modified form of protector; and FIG. 14 is a fragmentary sectional view similar to FIG. 13 and showing yet another form of protector.

DETAILED DESCRIPTION

Referring now in more detail to the drawing and in particular to FIGS. 1 – 9, there is shown a protector 2 having a generally rectilinear housing 4 of suitable insulating plastic material. The upper end of the housing 4 has a neck portion 6 that terminates in a flange 8 by which the protector may be gripped for removal from and placement into a receptacle. At its lower end the housing includes a base 10 of insulating plastic which closes the opening 12 that is formed by the walls of the housing 4. Mounted in and projected outwardly from the base 10 is a series of conductive plug-in terminal pins 14, 16, 18, 20 and 22. There is a first line pin 14, a first central office pin 16, a second line pin 18, a second central office pin 20, a ground pin 22, and a polarizing pin 28 which is a plastic dummy pin integrally molded with base 10. The first line pin 14 and the first central office pin 16 are components in one of the lines through the protector while the second line pin 18 and the second central office pin 20 are components in the other line through the protector. The ground pin 22 is suitably connected in a known manner to ground while the polarizing pin 24 simply insures proper orientation of the protector when it is plugged into its receptacle.

Staked to the line pin 14 on the inside of the base 10 is a line contact 26 having an offset portion 28 seated on a raised rib 30 integrally formed on the base 10. A bobbin contact 32 is staked to the central office pin 16. The bobbin contact 32, as best seen in FIGS. 3, 6, and 9, has a generally T-shaped base 34 at which the pin 16 is staked. In addition, the bobbin contact 32 has spaced apart, upwardly inclined resilient fingers 36, 36 which extend slightly above the rib 30. A line contact 26a is staked to the line pin 18 and a bobbin contact 32a is staked to the central office pin 20a, as best seen in FIGS. 4 and 6. The line contact 26a and the bobbin contact 32a are respectively identical with the line contact 26 and bobbin contact 32.

Seated on the contacts 26, 32 is a heat coil assembly 38 and similarly seated on the contacts 26a, 32a is a heat coil assembly 38a (FIG. 4) which is identical to the heat coil assembly 38. As seen in FIGS. 3 and 4, each heat coil assembly includes a cylindrical metallic bobbin 40 having an axial bore 42 extending completely therethrough and an upper annular end flange 44. Secured to the lower end of the bobbin 40 is a cylindrical plastic insulating disc 46 having an annular metallic band 48 secured to the periphery thereof. The disc 46 serves to insulate the band 48 from the remainder of the bobbin 40. Wrapped around the bobbin 40 is a coil of wire 50 having one end thereof permanently secured to the periphery of the end flange 44 in conductive connection therewith. The other end of the coil of wire 50 is permanently and conductively secured to the metal band 48.

The offset 28 of the line contact 26 engages the lower end of the bobbin 40 while the resilient fingers 36, 36 straddle the bobbin and engage the downwardly presented surface of the metal band 48. Consequently, a line circuit is established from the outside line to the pin 14, contact 26, bobbin 40, through the coil of wire 50, metal band 48, bobbin contacts 32 and to the pin 16. A second line circuit is established in a similar manner from line pin 18 through the heat coil assembly 38a to the central office pin 20. By having the heat coil assemblies 38, 38a adjacent to the base 10 and by utilizing the simple line and bobbin 26, 26a, 32, 32a, the possibility of noise in the line circuits is substantially reduced over prior constructions in which the heat coil assemblies are considerably more remote from the base of the protector.

Telescoped within the bobbin 40 is a pin 52 the upper end of which has a head 54. Radially interposed between the pin 52 and the bore 42 is a fusible element 56 in the form of a cylindrical film of solder that retains the pin 52 rigidly assembled with the bobbin 40 except upon an overcurrent condition in the associated line circuit, as will presently be more fully described. As seen in FIG. 4, the bobbin of the heat coil assembly 38a has a like pin 52a that is held rigidly assembled with its associated bobbin by a fusible element like that shown at 56 in FIG. 3.

Again referring to FIG. 3, it is seen that above the heat coil assembly 38 is an inverted generally cylindrical metallic cup 58 that opens toward the base and houses an overvoltage protective device 60. In the form of the invention shown in FIGS. 3 and 4, this overvoltage protective device comprises a pair of cylindrical coaxial carbon electrodes 62, 64 which establish an arc gap 66. The electrode 62 is bonded by adhesive 63 centrally within a surrounding insulating member 68, the upper edge of which extends beyond the upper edge of the electrode 62 so that when the electrode 64 is seated against the upper edge of the insulating member 68, the arc gap 66 will be established. The upper end of the electrode 64 is in conductive contact with the end wall 70 of the cup 58.

Above the cup 70 and engaging against the end wall 70 thereof is the larger-diameter end of a volute spring 72. This spring is essentially a sheet of resilient metal formed into the coil shape shown in perspective in FIG. 7. The smaller diameter end of the volute spring 72 bears against the cylindrical end wall 74 of a metallic shunt 76. This shunt 76 has a series of circumferentially spaced fingers 78 which extend toward the base 10 and are resilient for engagement with the exterior of the sidewall of the cup 58. The shunt 76 thus constitutes a receptacle for the volute spring 72, the cup 58, and the overvoltage protective unit 60 within the cup 58. It will be apparent from FIG. 4 that there is a cup 58a with an arc gap overvoltage protective device 60a therein, a volute spring 72a and a shunt 76a with spring fingers 78a, all similar to the corresponding parts previously described.

Referring to FIG. 8 it will be seen that the housing 4 has adjacent and communicating elongated cavities 80, 80a for receiving each heat coil assembly 38, 38a, protective devices 60, 60a, cups 58, 58a, volute springs 72, 72a and shunts 76, 76a. Also, the cavities 80, 80a have elongated slots 82, 82a for receiving the fingers 78, 78a of the respective shunts 76, 76a. Furthermore, the heat coil assembly 38 cup 58, and protective unit 60, volute spring 72 and shunt 76 are in line within the housing cavity 80 and are substantially coaxial. The same is true of those corresponding parts bearing the suffix a. At its upper end the housing 4 has an end wall 84 which is at the ends of the cavities 80, 80a. This end wall receives a grounding plate 86 and lies in abutting relationship with the end walls 74, 74a of the respective shunts 76, 76a, as seen in FIG. 4. The ground pin 22 is staked at its upper end to the grounding plate 86, as shown in FIGS. 2 and 5. Furthermore, the grounding pin 22 is covered with insulating sleeve 88 over the part thereof that extends between the plate 86 and the base 10. Thus, the grounding plate 86 provides a common ground connection from each of the shunts 76, 76a to the grounding pin 22.

The protector of the present invention is characterized by ease of assembly. Thus, the base 10 is preassembled with the contacts and pins separately from the remainder of the housing. The grounding plate 86 and assembled ground pin 22 may be inserted into the cavities 80, 80a. Thereafter, a sub-assembly consisting of the shunt 76, volute spring 72 and cup 58 with protective device 60 therein may be inserted into the cavity 80. Thereafter, the heat coil assembly 38 may be inserted into the cavity 80. A like procedure is followed with respect to the corresponding components bearing the suffix a previously described. Thereafter, the base 10 is assembled to the remainder of the housing to close the opening 12 and compress the volute springs, as shown in FIG. 3 and the left hand portion of FIG. 4. The base 10 is retained with the remainder of the housing by a screw 90 which projects through the base and is threaded into a hole 92 in the thickened sidewall section of the housing, as best seen in FIGS. 2 and 4.

In the event of an overvoltage condition of short duration on either line there will be an arc across the arc gap of the associated overvoltage device to ground through the ground pin 22. Thus, for example, an overvoltage at the pin 14 will, through its conductive connection with the contact 26, bobbin 40, pin 52 and electrode 62, will cause an arc at the gap 66 which will be conducted from the electrode 64 through the volute spring and shunt 76 to the ground plate 86 and to the ground pin 22.

If, however, there is an overcurrent condition in one of the line circuits, for example in the line circuit containing the pins 14 and 16, the heat from the coil 50 will be transmitted to the bobbin 40 which will heat the solder 56 and cause it to melt. The volute spring 72 is then no longer opposed by the solder film 56 and so the volute spring longitudinally extends pushing the rim of the cup 58 into direct engagement with the end flange 44 of the bobbin. As a result, a direct metallic shunt is provided from the line pin 14 through the contact 26, bobbin 40, cup 58, volute spring 72 and shunt 76, to ground plate 86 and to the ground pin 22. The shunt 76 and volute spring 72 cooperate to carry large currents to the ground plate. In the event that an overcurrent condition occurs in the line circuit containing the pins 18 and 20, a similar situation will occur as shown in the right hand half of FIG. 4. There, the overcurrent condition has melted the solder film and caused the volute spring 72a to extend longitudinally and press the rim 59a of the cup 58a into engagement with the bobbin flange 44a.

FIG. 10 shows a modified form of protector which is similar to the arrangement previously described except that a gas filled tube protective device is used in lieu of the carbon electrodes 62, 70. The gas filled tube 96 in the cup 58 is of known construction and comprises electrodes 98, 100 which define an arc gap 102. The electrodes 98, 100 are separated by a glass or ceramic cylinder 104 and to which each electrode is bonded in a conventional manner. Surrounding the electrode 100 is a plastic insulation 106 which may be heat shrunk in place so as to insulate the electrode 100 from the cup 58. The electrodes 98, 100 are somewhat frusto-conical in shape, and the pin 52a is somewhat longer than the pin 52 although it functions in generally the same manner. The pin 52a engages the end wall of the electrode 100 that establishes one side of the arc gap. Also, a solder pellet 108 is interposed between the electrode 98 and the base of the cup 58.

For overvoltage conditions of short duration the arc will be across the gap 102 and to ground as previously described. For overvoltage conditions which cause an arc across the gap 102 and result in low currents for sustained periods of time, the heat generated by the current or heat applied through the electrode 98 to the solder pellet 108, will cause the solder pellet 108 to melt. This results in the volute spring 72 expanding to bring the cup 58 into direct metallic contact with the end flange of the bobbin 40. On the other hand, when the currents are quite high and applied for a short period of time which is insufficient to melt the solder pellet 108, an erosion of electrodes at the arc gap 102 will cause them to rupture thereat whereby the pin 52a no longer opposes the thrust of volute spring 72. At that time the spring presses the cup 58 into direct metallic contact with the end flange of the bobbin 40. Finally, the overcurrent condition may result in a coil of wire of the heat coil assembly melting the solder film 56 and thereby bring the cup 58 into engagement with the bobbin flange. In any case, the protector assures that regardless of the manner of response in an overcurrent condition the line will be directly grounded in a manner that bypasses the electrodes of the gas tube.

FIGS. 11 and 12 show a further modified form of the present invention which is similar to protector shown in FIGS. 1 – 9 except that the heat coil assembly is eliminated and the contacts at the base 10 are simplified. Thus, in the simplified version of the protector shown in FIGS. 11 and 12 the line circuit between the pins 14 and 16 are established by a simple jumper contact strip 110 that is staked to the pin 14 and 16 and is bent over the rib 30 of the base 10. The protector provides overvoltage protection in those situations where overcurrent protection is not specifically required or is provided by some other supplementary means. Accordingly, a cylindrical conductive spacer 112 having an approximate diameter and length of the coil assembly 38 is substituted for the heat coil assembly and seats on the jumper 110. The upper end of the spacer 112 has a central integral pin 52b with a head 54b to substitute for the pin 52 previously described. Thus, the protector unit 60, the volute spring 72, the shunt 76, grounding plate 86 and ground pin 22 can be the same as those previously described. In FIG. 12 it is seen that a jumper 110a similar to the jumper 110, may extend between the line pins 18, 20.

In FIG. 13 a further modified form of protector is shown wherein a gas tube like that earlier described is used for overvoltage protection but no heat coil is used in the line circuit. The conductive cylindrical spacer 112a seats on the jumper 110 that joins the line pin terminals as shown in FIGS. 11 and 12. The spacer 112a includes an upward projection or pin portion 114 that engages the electrode 100 much in the manner as shown in FIG. 10. The lower portion of the pin 114 may be conically flared out to provide strength for the pin 114. In an overcurrent condition the solder element 108 can melt or the electrodes can erode. In either form of response by the protector, the volute spring 72 presses the cup 58 into direct metallic with the spacer 112a so as to form a direct metallic circuit from the line to ground.

A further modified form of protector is shown in FIG. 14 which is like that shown in FIG. 13 except that the spacer 112b has a bore 42b and a pin 114b therein. The pin 114b engages the electrode 100 and is retained rigidly in the 442b by the solder film 56b. The solder film 56b is a much smaller mass than the solder in the spacer 108. Therefore, with like amounts of heat conducted from the gas tube, the solder film 56b may melt more quickly than the solder pellet 108, and thereby increase the response time of the protector. Thus, the protector of FIG. 14 has, in effect, two solder elements either of which when melted will allow the cup 58 to come into direct metallic engagement with the spacer 112b and thereby establish a direct metallic ground from the jumper 110 to the ground pin.

In FIGS. 10 – 14 the protective arrangement is shown for only one of the lines. However, the arrangement for the other line that includes pins 18, 20 is identical, i.e. the protectors are dual type units as indicated in FIG. 4.

The invention is claimed as follows:

1. A line protector for a communications circuit comprising a housing of insulating material and including a base, line terminals in said base, a ground terminal in said base, overvoltage protective means in spaced relation to said base, said protective means having spaced electrodes forming an arc gap, means forming a line circuit between said line terminals, first means forming a grounding circuit between one electrode and said ground terminal, second means forming a conductive connection between said line circuit and the other electrode, and longitudinally extensible spring means biasing said protective means toward said base, said spring means forming part of said ground circuit, said spring means, said protective means and said second means being structures that are in line within the housing and are substantially coaxial.

2. A line protector according to claim 1 in which said protective means comprises a conductive cup that contains said electrodes and with said one electrode being in conductive contact therewith, said cup opening toward said base.

3. A line protector according to claim 2 in which said cup has a base that is engaged by said spring means.

4. A line protector according to claim 3 in which said spring means is a volute spring, and wherein a shunt engages said cup and also receives said spring so that both the shunt and the spring are in said grounding circuit and the shunt is a receptacle for said cup and said spring.

5. A line protector according to claim 1 including a fusible element opposing said spring means, said fusible element fusing upon an overcurrent fault to cause said spring means to move said protective means to a position in which a direct metallic connection is made between said first and second means, by passing said arc gap.

6. A line protector according to claim 2 including a fusible element in said cup which fuses in an overcurrent fault to cause said spring means to move said cup into direct metallic contact with said second means.

7. A line protector according to claim 6 in which said electrodes are part of a gas-filled tube.

8. A line protector according to claim 6 in which said electrodes are carbon blocks.

9. A line protector according to claim 5 including a heat coil in said line circuit for heating said fusible element.

10. A line protector according to claim 5 in which said second means includes a conductive spacer between the line circuit and said other electrode.

11. A line protector for a communications circuit having an insulating base, line terminals and a ground terminal on said base, means forming a line circuit between said line terminals, means providing overvoltage protection from said line circuit to said ground terminal, said last-named means including electrodes forming an arc gap, means providing a direct metallic current path from said line circuit to said ground terminal in the event of an overcurrent condition in said line; said last-named means including a metallic member in conductive contact with one of said electrodes and being positioned between said one electrode and said base, a heat coil around said metallic member, an element fusible by heat from said heat coil upon occurrence of said overcurrent condition, and a spring opposed by said fusible element except upon fusing thereof to effect the formation of said direct metallic path; said heat coil forming part of said line circuit, a contact connected to one of said line terminals and to one end of the heat coil, and an additional contact connected to the other line terminal and to the other end of said heat coil and to said metallic member, said contacts lying entirely between said metallic member and said base.

12. A line protector for a communications circuit comprising a housing of insulating material and including an end and a base opposite to said end, line terminals and a ground terminal in said base, overvoltage protective means in said housing and including spaced electrodes defining an arc gap, means located between said protective means and said base and forming a line circuit connecting said line terminals, means forming a grounding circuit from one electrode to said ground terminal, means forming a circuit from at least one of the line terminals to said other electrode so that an overvoltage condition on the line produces at said arc gap an arc which is discharged to ground through said grounding circuit, spring means interposed between said housing end and said protective means for biasing said protective means toward said base, a shunt in electric contact with said spring means and said one electrode so that the shunt and spring means form conductive parallel parts of said grounding circuit, and said shunt forming a receptacle for said protective means and said spring means.

13. A line protector according to claim 12 in which said spring means is a volute spring, said protective means includes a conductive cup for said electrodes, and said shunt has a plurality of resilient fingers that engage the exterior of said cup.

14. A line protector according to claim 13 in which said electrodes are part of a gas-filled tube that is within said cup, and said other electrode has an insulating sleeve to insulate that electrode from the cup.

15. A line protector according to claim 14 including means in pressure engagement with one of said electrodes, which pressure engagement prevents metallic grounding of said line circuit except upon erosion of said pressureengaged electrode due to an overcurrent condition whereby in such overcurrent condition the line circuit is grounded in a manner that is externally of the gas tube.

* * * * *